3,734,758
Patented May 22, 1973

3,734,758
NOVEL FLAME RETARDANT COMPOSITIONS OF MATTER

Henryk A. Cyba, Evanston, and Allen K. Sparks, Des Plaines, Ill., assignors to Universal Oil Products Company, Des Plaines, Ill.
No Drawing. Continuation-in-part of application Ser. No. 757,763, Sept. 5, 1968. This application May 6, 1971, Ser. No. 141,028
Int. Cl. C08b 27/04
U.S. Cl. 106—193 R                  10 Claims

ABSTRACT OF THE DISCLOSURE

Novel flame retardant compositions of matter comprise a mixture of an imide of a halo-substituted polyhydrocyclicdicarboxylic acid, a polymeric compound and an antimony-containing compound. These compositions of matter are exemplified by a mixture of the N-methyl imide of 5,6,7,8,9,9-hexachloro-1,2,3,4,4a,5,8,8a-octahydro-5,8-methano-2,3-naphthalenedicarboxylic acid, polypropylene and antimony trioxide. These compositions of matter are useful where a high degree of resistance to flame and low volatility are the required characteristics of the product.

CROSS REFERENCE TO RELATED APPLICATION

This application is a continuation-in-part of our copending application Ser. No. 757,763 filed Sept. 5, 1968, now abandoned.

STATE OF THE ART

It is known in the prior art that polymeric compounds or substances of the type hereinafter set forth in greater detail may be admixed with halogen-containing compounds, as exemplified by polyhalo-substituted polyhydrocyclidicarboxylic acids or anhydrides thereof, to impart flame retardant properties to the finished composition of matter. In addition, it is known in the prior art to add antimony-containing compounds to these acids or anhydrides to enhance the aforementioned flame retardant properties. However, as will be hereinafter shown in greater detail, the combination of an imide of a polyhalo-substituted polyhydrocyclicdicarboxylic acid and an antimony-containing compound, when added to a polymeric substrate will impart a totally unexpected increase in flame retardant properties to said substrate as well as permitting the substrate to retain desirable physical characteristics.

This invention relates to novel compositions of matter comprising a mixture of an imide of a halo-substituted polyhydrocyclicdicarboxylic acid, a polymeric compound and an antimony-containing compound. More specifically, the invention relates to these compositions of matter which are useful in situations where a high degree of flame resistance or flame retardancy is a required physical characteristic of the finished product.

The novel compositions of matter will, as hereinbefore set forth, be useful in situations where the product may be subjected to excessive heat or to the action of a possible flame, such places including artchitectural panels for construction work, wall plugs for electrical connections, soundproofing or insulation in walls, ceiling, etc., cushions for various vehicle seats such as airplane seats, automobile seats, bus seats, truck seats, etc. Likewise, the composition of matter when utilized as a constituent of paint, lacquer, varnishes or protective coatings, films, etc. will also impart a flame resistancy to these compounds and therefor render them commercially attractive as articles of commerce. In addition to imparting the desirable physical characteristics of flame retardancy to the various articles of manufacture, the compounds will also be rendered more stable to color changes and therefore will be important components of these compounds whenever it is desirable that discoloration of the finished product is to be avoided or will tend to render such articles unusable. Other desirable physical characteristics of the compositions of matter will be found in the fact that the one component of the compound, besides adding flame retardancy to the various compounds containing at least one reactive functional group, will also preserve such physical properties as elongation, tensile strength, melt index, degree of cross-linking, bending strength, impact strength, etc.

It is therefore an object of this invention to provide novel compositions of matter which possess desirable physical characteristics.

Another object of this invention is to provide novel compositions of matter which possess desirable physical properties of flame retardancy and flameproofing thereby rendering said compositions of matter important articles of manufacture.

In one aspect an embodiment of this invention resides in a flame retardant composition of matter selected from the group consisting of polyolefins and ABS containing from about 0.5 to about 10 wt. percent of an antimony-containing compound and from about 5 to about 50 wt. percent of an imide of a halogen-substituted polyhydrocyclicdicarboxylic acid having the formula:

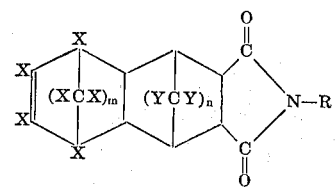

or

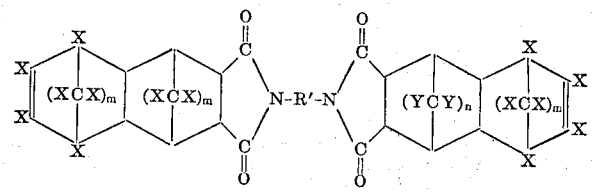

in which X is a halogen or hydrogen, at least two X's being halogen; Y is halogen or hydrogen; $m$ is 1 or 2; $n$ ranges from 0 to 2; R is selected from the group consisting of hydrogen and monovalent R' and R' is selected from the group consisting of alkyl and aminoalkyl of from 1 to 20 carbon atoms, polyalkenepolyamino, aryl, haloaryl, alkoxyaryl, polyarylenepolyamino of from 1 to 3 carbocyclic rings and aminocyclopolyalky and polyalkenepolyamino having from 4 to 8 carbon atoms on the ring.

A specific embodiment of this invention is found in a novel flame retardant composition of matter comprising polypropylene from 0.2 to about 10 wt. percent of antimony trioxide and from about 5 to about 50 wt. percent of the N-methyl imide of 5,6,7,8,9,9-hexachloro-1,2,3,4,4a,5,8,8a-octahydro-5,8-methano - 2,3-naphthalenedicarboxylic acid.

Other objects and embodiments will be found in the following further detailed description of the present invention.

As hereinbefore set forth the present invention is concerned with novel compositions of matter comprising an imide of a halo-substituted polyhydrocyclicdicarboxylic acid, a polymeric compound and an antimony-containing compound. For purposes of this invention, the term "imide of a halo-substituted polyhydrocyclicdicarboxylic acid" will refer to both mono- and bisimides of cyclicdicarboxylic acids containing halo-substituents.

As will be hereinafter shown in greater detail it was unexpectedly discovered that by utilizing an imide of a polyhalo-substituted polyhydrocyclidicarboxylic acid as the flame retardant component of the composition, a substantially greater flame retardant property was imparted to the polymeric compound, especially when utilizing an antimony-containing compound in conjunction therewith. In addition to imparting an unexpectedly greater flame retardant property, it was also found other physical properties such as elongation and yield value of the polymeric substrate were not adversely effected by the use of said imides. This is in contradistinction to the deleterious effect on the aforementioned elongation and yield values which is found when utilizing a polyhalo-substituted polyhydrocyclicdicarboxylic acid or anhydride thereof in the same polymeric substrates. Thus, by utilizing an imide of a polyhalo-substituted acid in conjunction with an antimony-containing compound which imparts a synergistic effect to the frame retadancy, it is possible to prepare polymeric compositions of matter which possess flame retardant properties vastly superior to the flame retardant property of the untreated polymer and in addition, the treated polymeric compound will also possess elongation and yield value properties which are similar to the untreated polymer.

In addition, these compounds may be mono-cyclic or polycyclic in nature. Any suitable polyhalo-substituted polyhydropolycyclicdicarboxylic acid or anhydride thereof may be used in the preparation of the desired composition of matter, said polyhalo-substituted polyhydropolycyclicdicarboxylic acid or anhydride thereof being illustrated by the following general formulae:

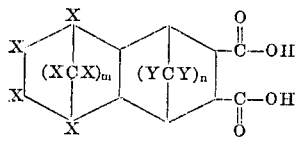

or

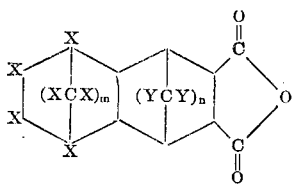

in which X is selected from the group consisting of halogen and particularly chlorine and/or bromine, and hydrogen radicals, at least two of the X's being halogen, Y is also selected from the group consisting of halogen and hydrogen radicals, m is an integer of from one two and n ranges from zero to two. Representative examples of the polyhalopolyhydropolycyclicdicarboxylic acids or anhydrides thereof which may be utilized include 5,6,7,8,9,9-hexachloro - 1,2,3,4,4a,5,8,8a-octahydro-5,8-methano-2,3-naphthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with halocycloalkadiene such as hexachlorocyclopentadiene to form the desired product. It is to be understood that the corresponding anhydride may be prepared by utilizing maleic anhydride as one of the starting materials in place of maleic acid. Another example of a polyhalopolyhydropolycyclicdicarboxylic acid or anhydride which may be used is one which is prepared by condensing cyclopentadiene with maleic acid or maleic anhydride to form norborn-5-ene-2,3-dicarboxylic acid or anhydride and thereafter condensing this product with hexachlorocyclopentadiene to form 5,6,7,8,9,9-hexachloro - 1,2,3,4,4a,5,8,8a - octahydro-1,4,5,8-dimethano-2,3-naphthalenedicarboxylic acid or anhydride. It is to be understood that other starting materials may also be utilized to form similar acids or anhydrides. Illustrative examples of these starting materials include other acids such as fumaric acid, itaconic acid, citraconic acid, glutaconic acid, etc.; conjugated aliphatic dienes include 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo-substituted cycloalkadienes which may be used include 1,2-dichlorocyclopentadiene, 1,2,3-trichlorocyclopentadiene, 1,2,3,4-tetrachlorocyclopentadiene, 1,2,3,4,5-pentachlorocyclopentadiene and similar compounds in which all or part of the chlorine is replaced by other halogen atoms and particularly bromine. In addition, it is also contemplated within the scope of this invention that halo-substituted phthalic acid or phthalic anhydride such as 1,4-dichlorophthalic acid, 1,4-dichlorophthalic anhydride, 1,4,5-trichlorophthalic acid, 1,4,5-trichlorophthalic anhydride 1,4,5,6-tetrachlorophthalic acid, 1,4,5,6-tetrachlorophthalic anhydride, 1,4-dibromophthalic acid, 1,4-dibromophthalic anhydride, 1,4,5-tribromophthalic acid, 1,4,5-tribromophthalic anhydride, 1,4,5,6-tetrabromophthalic acid, 1,4,5,6-tetrabromophthalic anhydride, may also be used as one of the materials in preparing the imide. It is also contemplated that mixtures of the above disclosed anhydrides or acids may be used to prepare the composition of this invention.

Examples of amine compounds which may be utilized in the process of the present invention as the other starting materials to thus form the novel compositions of matter will possess the generic formula:

in which R is selected from the group consisting of hydrogen, alkyl and aminoalkyl of from 1 to 20 carbon atoms, polyalkenepolyamino, aryl, aminoaryl, haloaryl, alkoxyaryl, polyarylenepolyamino of from 1 to 3 carbocyclic rings and aminocycloalkyl and polycycloalkenepolyamino having from 4 to 8 carbon atoms in the ring.

Specific examples of these compounds which must contain at least one primary nitrogen atom include alkylmonoamines containing from 1 to 20 carbon atoms such as methylamine, ethylamine, the isomeric propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl amines, etc.; amines prepared from fatty acid derivatives such as tallow amine, hydrogenated tallow amine, lauryl amine, stearyl amine, oleyl amine, linoleyl amine, etc.; alkylene polyamines such as ethylenediamine, propylenediamine (diamino propane), butylenediamine, pentylenediamine, hexylenediamine, etc.; N-alkyl substituted diamino alkanes such as N - methyldiaminoethane, N - ethyldiaminoethane, N-methyl-1,3-diaminopropane, N-ethyl-1,3-diaminopropane, other N-alkyl-1,3-diaminopropanes in which the alkyl group may contain carbon atoms ranging from 2 up to about 20 carbon atoms and thus the alkyl group is selected from hexyl, heptyl, octyl, nonadecyl, undecyl, dodecyl, tridecyl, tetradecyl, etc. radicals. In addition, other N-alkyl diaminoalkanes such as the N-alkyl-1,4-diaminobutanes, N-alkyl-1,2-diaminopentanes, N-alkyl-1,5-diaminopentanes, N - alkyl - 1,2 - diaminohexanes, N-alkyl - 1,3 - diaminohexanes, N - alkyl - 1,6 - diaminohexanes, etc., as well as N-dialkyl substituted alkylenediamines, may also be used.

Other amine compounds which may be used include polyalkylenepolyamines and N-substituted derivatives thereof including diethylenetriamine, dipropylenetriamine, dibutylenetriamine, dipentylenetriamine, dihexylenetriamine, diheptylenetriamine, dioctylenetriamine, etc., triethylenetetraamine, tripropylenetetraamine, tributylenetriamine, tripentylenetetraamine, trihexylenetetraamine, triheptylenetetraamine, trioctylenetetraamine, etc., tetraethylenepentamine, tetrapropylenepentamine, tetrapentylenepentamine, tetrahexylenepentamine, tetraheptylenepentamine, etc., pentaethylenehexamine, pentapropylenehexamine, pentabutylenehexamine, pentapentylenehexamine, etc.

It is also contemplated within the scope of this invention that N-alkyl-1,3-diaminopropanes in which the alkyl group contains from about 8 to about 25 carbon atoms of which a number of the class are commercially available may also be utilized although not necessarily with equivalent results. For example, certain amine compounds known as "Duomeen T" and "Diam 26" in which the alkyl group is derived from tallow and contains from about 12 to about 20 carbon atoms per group and mostly 16 to 18 carbon atoms per group may be utilized as the amine starting material in the present invention.

Aromatic amines which may be used include monoamines such as aniline, the toluidines, the xylidines, naphthylamine, anthracylamine, etc.; aromatic polyamines such as o-phenylenediamine, m-phenylenediamine, p-phenylenediamine, 1,2 - naphthalenediamine, 1,4 - naphthalenediamine, 1,5 - naphthalenediamine, 1,6 - naphthalenediamine, 1,7-naphthalenediamine, 1,8-naphthalenediamine, 2,3 - naphthalenediamine, 2,6 - naphthalenediamine, 2,7-naphthalenediamine, 1,2,3-triaminobenzene, 1,2,4-triaminobenzene, 1,3,5-triaminobenzene, etc., polyarylenepolyamines such as diaminodiphenylamine, diaminodinaphthylamine, aminodinaphthylamine, etc., cycloalkylamines such as cyclobutylamine, cyclopentylamine, cyclohexylamine, cycloheptylamine, cyclooctylamine, 2 - methylcyclobutylamine, 3 - methylcyclobutylamine, 3 - methylcyclopentylamine, 2-methylcyclohexylamine, 4-methylcyclohexylamine, etc., cycloalkyleneamines such as the isomeric cyclobutyldiamines, cyclopentyldiamines, cyclohexyldiamines, cycloheptyldiamines, cyclooctyldiamines, etc., polyalkylenepolycycloalkylenepolyamines such as diaminodicyclobutylamine, diaminodicyclopentylamine, diaminodicyclohexylamine, the tricycloalkyltetraamines, the tetracycloalkylpentamines, etc. It is to be understood that the aforementioned amine compounds are only representative of the class of compounds falling within the generic formula hereinbefore set forth and that the present invention is not necessarily limited thereto.

The aforementioned amine compound and the halo-substituted polyhydrocyclicdicarboxylic acid are condensed under condensation conditions and preferably in the presence of a substantially inert organic solvent such as aromatic hydrocarbons such as benzene, toluene, xylene, ethylbenzene, etc.; paraffinic hydrocarbons such as n-pentane, n-hexane, n-heptane, or cyclic paraffins such as cyclic pentane, cyclic hexane, cyclic heptane, methylcyclopentane, etc. The condensation conditions which are employed preferably include elevated temperatures in the range of from about 50° to about 250° C. or more, the particular reaction temperature being dependent upon the solvent which is utilized in the reaction, the reaction usually being effected at the reflux temperature of the solvent. In addition, the reaction time will be dependent to some extent upon the particular temperature which is employed and will usually range from about 0.5 up to about 5 hours or more. The aforementioned condensation process may be effected in any suitable manner and may comprise either a batch or continuous type operation. When a batch type operation is used, an amine compound of the type hereinbefore set forth is placed in an appropriate reaction vessel along with, if so desired, a substantially inert organic solvent. The halo-substituted polyhydrocyclicdicarboxylic acid or anhydride thereof is slowly added thereto, the reaction usually being exothermic. To control this exothermicity, the amine compound may be cooled prior to the addition of the acid or anhydride and the rise in temperature control by utilization of any external cooling means such as an ice bath. Upon completion of the addition of the acid or anhydride, the reaction mixture is heated to the reflux temperature of the solvent, if one is used, or to a predetermined reaction temperature. In addition, the reaction vessel which is utilized is provided with means for removing the water which is formed during the reaction. Upon completion of the desired residence time, which is evidenced by the removal of the theoretical amount of water, the reaction mixture is allowed to cool to room temperature. Following this, the solvent may be removed by distillation and the reaction product is recovered.

The reaction may also be effected in a continuous manner of operation in which the acid or anhydride and the amine compound are continuously charged to a reaction vessel which is maintained at the proper operation conditions. In addition, the organic solvent which is to be employed may be charged through separate means or, if so desired, may be admixed with one or both of the starting materials and charged thereto in a single stream. Upon completion of the desired residence, the reactor effluent is continuously removed, the unreacted starting materials are separated from the effluent and recycled to form a portion of the feed stock. The remainder of the effluent is then subjected to fractional distillation to remove the solvent and the water and thereafter purified to recover the desired imide.

Some specific examples of these imides of halo-substituted polyhydrocyclicdicarboxylic acids will include monoimides such as the N-methyl imide of 5,6,7,8,9,9-hexachloro-1,2,3,4,4a,5,8,8a-octahydro-5,8-methano-2,3-naphthalenedicarboxylic acid, the N-ethyl imide of 5,6,7,8,9,9-hexachloro-1,2,3,4,4a,5,8,8a-octahydro-5,8-methano-2,3-naphthalenedicarboxylic acid, the N-propyl imide of 5,6,7,8,9,9-hexachloro-1,2,3,4,4a,5,8,8a-octahydro-5,8-methano-2,3-naphthalenedicarboxylic acid, the N-butyl imide of 5,6,7,8,9,9-hexachloro-1,2,3,4,4a,-5,8,8a-octahydro-5,8-methano-2,3-naphthalenedicarboxylic acid, the N-octyl imide of 5,6,7,8,9,9-hexachloro-1,2,3,4,4a,5,8,8a-octahydro-5,8-methano-2,3-naphthalenedicarboxylic acid, the N-cyclohexyl imide of 5,6,7,8,9,9-hexachloro-1,2,3,4,4a,5,8,8a-octahydro-5,8-methano-2,3-naphthalenedicarboxylic acid, the N-phenyl imide of 5,6,7,8,9,9-hexachloro-1,2,3,4,4a,5,8,8a-octahydro-5,8-methano-2,3-naphthalenedicarboxylic acid, the N-diethylenediamino imide of 5,6,7,8,9,9-hexachloro-1,2,3,4,4a,5,8,8a-octahydro-5,8-methano-23-naphthalenedicarboxylic acid, the N-dipropylenediamino imide of 5,6,7,8,9,9-hexachloro-1,2,3,4,4a,5,8,8a-octahydro-5,8-methano-2,3-naphthalenedicarboxylic acid, the N-dibutylenediamino imide of 5,6,7,8,9,9-hexacholo-1,2,3,4,4a,5,8,8a-octahydro-5,8-methano-2,3-naphthalenedicarboxylic acid, the N-ethyleneamino imide of 5,6,7,8,9,9-hexachloro-1,2,3,4,4a,5,8,8a-octahydro-5,8-methano-2,3-naphthalenedicarboxylic acid, the N-propyleneamino imide of 5,6,7,8,9,9-hexachloro-1,2,3,4,4a,5,8,8a-octahydro-5,8-methano-2,3-naphthalenedicarboxylic acid, the N-phenyleneamino imide of 5,6,7,8,9,9-hexachloro-1,2,3,4,4a,5,8,8a-octahydro-5,8-methano-2,3-naphthalenedicarboxylic acid, the N-diphenyldiamino imide of 5,6,7,8,9,9-hexachloro-1,2,3,4,4a,5,8,8a-octahydro-5,8-methano-2,3-naphthalenedicarboxylic acid, the N-cyclohexaleneamino imide of 5,6,7,8,9,9-hexachloro-1,2,3,4,4a,5,8,8a-octahydro-5,8-methano-2,3-naphthalenedicarboxylic acid, the N-cyclopentaleneamino imide of 5,6,7,8,9,9-hexachloro-1,2,3,4,4a,5,8,8a-octahydro-5,8-methano-2,3-naphthalenedicarboxylic acid, the N-diaminocyclohexaleneamino imide of 5,6,7,8,9,9-hexachloro-1,2,3,4,4a,5,8,8a-octahydro-5,8-methano-2,3-naphthalenedicarboxylic acid, the N-methyl imide of 5,6,7,8,9,9-hexachloro-1,2,3,4,4a,5,8,8a-octahydro-1,4,5,8-dimethano-2,3-naphthalenedicarboxylic acid, the N-propyl imide of 5,6,7,8,9,9-hexachloro-1,2,3,4,4a,5,8,8a-octahydro-1,4,5,8-dimethano-2,3-naphthalenedicarboxylic acid, the N-octyl imide of 5,6,7,8,9,9-hexachloro-1,2,3,4,4a,5,8,8a-octahydro-1,4,5,8-dimethano-2,3-naphthalenedicarboxylic acid, the N-diethylenediaminoimide of 5,6,7,8,9,9-hexachloro-1,2,3,4,4a,5,8,8a-octahydro-1,4,5,8-dimethano-2,3-naphthalenedicarboxylic acid, the N-dibutylenediamino imide of 5,6,7,8,9,9-hexachloro-1,2,3,4,4a,5,8,8a-octahydro-1,4,5,8-dimethano-2,3-naphthalenedicarboxylic acid, the N-propyleneamino imide of 5,6,7,8,9,9-hexachloro-1,2,3,4,4a,5,8,8a-octahydro-1,4,5,8-dimethano-2,3-naphthalenedicarboxylic acid, the N-diphenyldiamino imide of 5,6,7,8,9,9-hexachloro-1,2,3,4,4a,5,8,8a-octahydro-1,4,5,8-dimethano-2,3-naphthalenedicarboxylic acid.

the N-cyclopentyleneamino imide of 5,6,7,8,9,9-hexachloro-1,2,3,4,4a,5,8,8a-octahydro-1,4,5,8-dimethano-2,3-naphthalenedicarboxylic acid, etc.;

and the bisimides such as 1,2-bis(5,6,7,8,9,9-hexachloro-1,2,3,4,4a,5,8,8a-octahydro-5,8-methano-2,3-naphthalenedicarboximido)ethane, 1,3-bis(5,6,7,8,9,9-hexachloro-1,2,3,4,4a,5,8,8a-octahydro-5,8-methano-2,3-naphthalenedicarboximido)propane, 1,4-bis(5,6,7,8,9,9-hexachloro-1,2,3,4,4a,5,8,8a-octahydro-5,8-methano-2,3-naphthalene-dicarboximido)butane, 1,2-bis(5,6,7,8,9,9-hexachloro-1,2,3,4,4a,5,8,8a-octahydro-1,4,5,8-dimethano-2,3-naphthalenedicarboximido)ethane, 1,3-bis(5,6,7,8,9,9-hexachloro-1,2,3,4,4a,5,8,8a-octahydro-1,4,5,8-dimethano-2,3-naphthalenedicarboximido)propane, 1,4-bis(5,6,7,8,9,9-hexachloro-1,2,3,4,4a,5,8,8a-octahydro-1,4,5,8-dimethano-2,3-naphthalenedicarboximido)butane, 1,4-bis(5,6,7,8,9,9-hexachloro-1,2,3,4,4a,5,8,8a-octahydro-5,8-methano-2,3-naphthalenedicarboximido)benzene, 1,4-bis(5,6,7,8,9,9-hexachloro-1,2,3,4,4a,5,8,8a-octahydro-1,4,5,8-dimethano-2,3-naphthalenedicarboximido)benzene, 1,4-bis(5,6,7,8,9,9-hexachloro-1,2,3,4,4a,5,8,8a-octahydro-5,8-methano-2,3-naphthalenedicarboximido)cyclohexane, 1,4-bis(5,6,7,8,9,9-hexachloro-1,2,3,4,4a,5,8,8a-octahydro-1,4,5,8-dimethano-2,3-naphthalenedicarboximido)cyclohexane, 1,5-bis(5,6,7,8,9,9-hexachloro-1,2,3,4,4a,5,8,8a-octahydro-5,8-methano-2,3-naphthalenedicarboximido)-3-azapentane, 1,5-bis(5,6,7,8,9,9-hexachloro-1,2,3,4,4a,5,8,8a-octahydro-1,4,5,8-dimethano-2,3-naphthalenedicarboximido)-3-azapentane, 1,8-bis(5,6,7,8,9,9-hexachloro-1,2,3,4,4a,5,8,8a-octahydro-5,8-methano-2,3-naphthalenedicarboximido)-3,6-diazaoctane, 1,8-bis(5,6,7,8,9,9-hexachloro-1,2,3,4,4a,5,8,8a-octahydro-1,4,5,8-dimethano-2,3-naphthalenedicarboximido)-3,6-diazaoctane, etc.

It is to be understood that the aforementioned imides and bisimides are only representative of the class of compounds which are used as one of the components of the novel compositions of matter of the present invention, and therefore the present invention is not necessarily limited thereto.

The aforementioned imides and bisimides of halo-substituted polyhydrocyclicdicarboxylic acids are admixed with various polymeric compounds, the polymeric compounds constituting the second component of the novel compositions of matter of the present invention. These compounds will include plastics, polymers, copolymers, terpolymers, naturally occurring textiles or fabrics such as cotton, wool, linen, etc., naturally occurring and synthetic rubber, leather, other synthetic fibers known in the trade as nylon, Dacron, rayon, etc. Examples of polymers and copolymers which may be treated with these imides and the antimony-containing compound to form the novel compositions of matter of the present invention will include an acrylonitrile-butadiene-styrene formulation (commonly known as ABS); foams such as polyurethane formulations; polyesters such as those prepared from maleic anhydride and ethylene glycol; polyolefins such as polyethylene, polypropylene, polybutylene, ethylene-propylene, polyisoprene, polystyrene or copolymers of those, etc.; polyphenyl ethers (polyphenylene oxide) which may or may not have been modified with styrene; acrylate and methacrylate polymers and copolymers; polyamides; polyoxymethylenes, polyalkylene oxides such as polyethylene oxide, polypropylene oxide; allyl resins and furan resins; phenolic resins; polysulfones; various cellulose derivatives such as the acetate, butyrate, acetate-butyrate, nitrile cellulose, cellulose propionate derivatives, etc. These various polymeric substances are only representative of the class of compounds which may be used and it is likewise to be understood that the present invention is not necessarily limited thereto.

The third component of the novel flame retardant composition of matter of the present invention will include an antimony-containing compound which will act as a synergist to enhance the flame retardant activity of the imide and bisimide in such a manner so that the finished composition of matter will possess a flame retardant property, especially if measured as an oxygen index, greater in excess over that which is possessed by other polymeric substances containing flame retardant compounds such as polyhalo-substituted polyhydrocyclicdicarboxylic acids or anhydrides. Representative examples of these antimony-containing compounds will include antimony dioxide, antimony trioxide, antimony oxychloride, trimethyl antimony, triethyl antimony, tripropyl antimony, tributyl antimony, triamyl antimony, triphenyl antimony, tribenzyl antimony, trimethyl antimony trichloride, triethyl antimony trichloride, tripropyl antimony trichloride, tributyl antimony trichloride, triphenyl antimony trichloride, tribenzyl antimony trichloride, trimethyl antimony sulfide, triethyl antimony sulfide, tripropyl antimony sulfide, tributyl antimony sulfide, triphenyl antimony sulfide, tribenzyl antimony sulfide, the corresponding alkoxy, dialkoxy and trialkoxy antimony derivatives, etc. It is also contemplated within the scope of this invention that the corresponding bismuth compounds may also be utilized, although not necessarily with equivalent results.

The novel composition of matter of the present invention which possess the desirable characteristics of an enhanced flame retardant as well as normal elongation and yield values are prepared by admixing the imide or bisimide of the halo-substituted polyhydrocyclicdicarboxylic acid, the polymeric substance and the antimony-containing compound in any conventional manner. For example, depending upon the physical form of the polymeric compound, the three components of the novel composition of matter may be mixed in a mixer, may be milled or may be extruded through a suitable apparatus after admixing to thus prepare the desired compound. It is contemplated that any mode of admixing the three components which are known in the art may be used, the above methods being merely set forth as illustrative examples of possible ways in which the novel flame retardant composition of matter may be formed. The imides or bisimides of the halo-substituted polyhydrocyclicdicarboxylic acid will be present in the finished composition of matter in an amount of from 5 to about 50% by wt. of the finished product, the antimony-containing compound will be present in an amount ranging from about 0.2 up to about 10% by wt. of the finished composition of matter and the polymeric substance will be present in an amount ranging from about 50 to about 94.8% by wt.

Some illustrative representative examples of the novel compositions of matter of the present invention will include mixtures of the N-methyl imide of 5,6,7,8,9,9-hexachloro-1,2,3,4,4a,5,8,8a-octahydro-5,8-methano-2,3-naphthalenedicarboxylic acid, ABS and antimony trioxide;
the N-methyl imide of 5,6,7,8,9,9-hexachloro-1,2,3,4,4a,5,8,8a-octahydro-5,8-methano-2,3-naphthalenedicarboxylic acid, polyethylene and antimony trioxide;
the N-methyl imide of 5,6,7,8,9,9-hexachloro-1,2,3,4,4a,5,8,8a-octahydro-5,8-methano-2,3-naphthalenedicarboxylic acid, polypropylene and antimony trioxide;
the N-methyl imide of 5,6,7,8,9,9-hexachloro-1,2,3,4,4a,5,8,8a-octahydro-5,8-methano-2,3-naphthalenedicarboxylic acid, polypropylene and antimony trioxide;
the N-methyl imide of 5,6,7,8,9,9-hexachloro-1,2,3,4,4a,5,8,8a-octahydro-5,8-methano-2,3-naphthalenedicarboxylic acid, polyphenylene oxide and antimony trioxide;
the N-methyl imide of 5,6,7,8,9,9-hexachloro-1,2,3,4,4a,5,8,8a-octahydro-5,8-methano-2,3-naphthalenedicarboxylic acid, polyoxymethylene and antimony trioxide;
the N-butyl imide of 5,6,7,8,9,9-hexachloro-1,2,3,4,4a,5,8,8a-octahydro-5,8-methano-2,3-naphthalenedicarboxylic acid, ABS and antimony trioxide;
the N-butyl imide of 5,6,7,8,9,9-hexachloro-1,2,3,4,4a,5,8,8a-octahydro-5,8-methano-2,3-naphthalenedicarboxylic acid, polyethylene and antimony trioxide;
the N-butyl imide of 5,6,7,8,9,9-hexachloro-1,2,3,4,4a,5,8,8a-octahydro-5,8-methano-2,3-naphthalenedicarboxylic acid, polypropylene and antimony trioxide;
the N-butyl imide of 5,6,7,8,9,9-hexachloro-1,2,3,4,4a,5,8,8a-octahydro-5,8-methano-2,3-naphthalenedicarboxylic acid, polyurethane and antimony trioxide;
the N-butyl imide of 5,6,7,8,9,9-hexachloro-1,2,3,4,4a,5,8,8a-octahydro-5,8-methano-2,3-naphthalenedicarboxylic acid, polyphenylene oxide and antimony trioxide;
the N-butyl imide of 5,6,7,8,9,9-hexachloro-1,2,3,4,4a,5,8,8a-octahydro-5,8-methano-2,3-naphthalenedicarboxylic acid, polyoxymethylene and antimony trioxide;
the N-octyl imide of 5,6,7,8,9,9-hexachloro-1,2,3,4,4a,5,8,8a-octahydro-5,8-methano-2,3-naphthalenedicarboxylic acid, ABS and antimony trioxide;
the N-octyl imide of 5,6,7,8,9,9-hexachloro-1,2,3,4,4a,5,8,8a-octahydro-5,8-methano-2,3-naphthalenedicarboxylic acid, polyethylene and antimony trioxide;
the N-octyl imide of 5,6,7,8,9,9-hexachloro-1,2,3,4,4a,5,8,8a-octahydro-5,8-methano-2,3-naphthalenedicarboxylic acid, polypropylene and antimony trioxide;
the N-octyl imide of 5,6,7,8,9,9-hexachloro-1,2,3,4,4a,5,8,8a-octahydro-5,8-methano-2,3-naphthalenedicarboxylic acid, polyurethane and antimony trioxide;
the N-octyl imide of 5,6,7,8,9,9-hexachloro-1,2,3,4,4a,5,8,8a-octahydro-5,8-methano-2,3-naphthalenedicarboxylic acid, polyphenylene oxide and antimony trioxide;
the N-octyl imide of 5,6,7,8,9,9-hexachloro-1,2,3,4,4a,5,8,8a-octahydro-5,8-methano-2,3-naphthalenedicarboxylic acid, polyoxymethylene and antimony trioxide;
the diethylenediamino imide of 5,6,7,8,9,9-hexachloro-1,2,3,4,4a,5,8,8a-octahydro-5,8-methano-2,3-naphthalenedicarboxylic acid, ABS and antimony trioxide;
the diethylenediamino imide of 5,6,7,8,9,9-hexachloro-1,2,3,4,4a,5,8,8a-octahydro-5,8-methano-2,3-naphthalenedicarboxylic acid, polyethylene and antimony trioxide;
the diethylenediamino imide of 5,6,7,8,9,9-hexachloro-1,2,3,4,4a,5,8,8a-octahydro-5,8-methano-2,3-naphthalenedicarboxylic acid, polypropylene and antimony trioxide;
the diethylenediamino imide of 5,6,7,8,9,9-hexachloro-1,2,3,4,4a,5,8,8a-octahydro-5,8-methano-2,3-naphthalenedicarboxylic acid, polyurethane and antimony trioxide;
the diethylenediamino imide of 5,6,7,8,9,9-hexachloro-1,2,3,4,4a,5,8,8a-octahydro-5,8-methano-2,3-naphthalenedicarboxylic acid, polyphenylene oxide and antimony trioxide;
the diethylenediamino imide of 5,6,7,8,9,9-hexachloro-1,2,3,4,4a,5,8,8a-octahydro-5,8-methano-2,3-naphthalenedicarboxylic acid, polyoxymethylene and antimony trioxide;
the N-diphenylenediamino imide of 5,6,7,8,9,9-hexachloro-1,2,3,4,4a,5,8,8a-octahydro-5,8-methano-2,3-naphthalenedicarboxylic acid, ABS and antimony trioxide;
the N-diphenylenediamino imide of 5,6,7,8,9,9-hexachloro-1,2,3,4,4a,5,8,8a-octahydro-5,8-methano-2,3-naphthalenedicarboxylic acid, polyethylene and antimony trioxide;
the N-diphenylenediamino imide of 5,6,7,8,9,9-hexachloro-1,2,3,4,4a,5,8,8a-octahydro-5,8-methano-2,3-naphthalenedicarboxylic acid, polypropylene and antimony trioxide;
the N-diphenylenediamino imide of 5,6,7,8,9,9-hexachloro-1,2,3,4,4a,5,8,8a-octahydro-5,8-methano-2,3-naphthalenedicarboxylic acid, polyurethane and antimony trioxide;
the N-diphenylenediamino imide of 5,6,7,8,9,9-hexachloro-1,2,3,4,4a,5,8,8a-octahydro-5,8-methano-2,3-naphthalenedicarboxylic acid, polyphenylene oxide and antimony trioxide;
the N-diphenylenediamino imide of 5,6,7,8,9,9-hexachloro-1,2,3,4,4a,5,8,8a-octahydro-5,8-methano-2,3-naphthalenedicarboxylic acid, polyoxymethylene and antimony trioxide;
1,2-bis(5,6,7,8,9,9-hexachloro-1,2,3,4,4a,5,8,8a-octahydro-5,8-methano-2,3-naphthalenedicarboximido)ethane, ABS and antimony trioxide;
1,2-bis(5,6,7,8,9,9-hexachloro-1,2,3,4,4a,5,8,8a-octahydro-5,8-methano-2,3-naphthalenedicarboximido)ethane, polyethylene and antimony trioxide;
1,2-bis(5,6,7,8,9,9-hexachloro-1,2,3,4,4a,5,8,8a-octahydro-5,8-methano-2,3-naphthalenedicarboximido)ethane, polypropylene and antimony trioxide;
1,2-bis(5,6,7,8,9,9-hexachloro-1,2,3,4,4a,5,8,8a-octahydro-5,8-methano-2,3-naphthalenedicarboximido)ethane, polyurethane and antimony trioxide;
1,2-bis(5,6,7,8,9,9-hexachloro-1,2,3,4,4a,5,8,8a-octahydro-5,8-methano-2,3-naphthalenedicarboximido)ethane, polyphenylene oxide and antimony trioxide;
1,2-bis(5,6,7,8,9,9-hexachloro-1,2,3,4,4a,5,8,8a-octahydro-5,8-methano-2,3-naphthalenedicarboximido)ethane, polyoxymethylene and antimony trioxide;
1,4-bis(5,6,7,8,9,9-hexachloro-1,2,3,4,4a,5,8,8a-octahydro-5,8-methano-2,3-naphthalenedicarboximido)benzene, ABS and antimony trioxide;
1,4-bis(5,6,7,8,9,9-hexachloro-1,2,3,4,4a,5,8,8a-octahydro-5,8-methano-2,3-naphthalenedicarboximido)benzene, polyethylene and antimony trioxide;
1,4-bis(5,6,7,8,9,9-hexachloro-1,2,3,4,4a,5,8,8a-octahydro-5,8-methano-2,3-naphthalenedicarboximido)ethane, polypropylene and antimony trioxide;
1,4-bis(5,6,7,8,9,9-hexachloro-1,2,3,4,4a,5,8,8a-octahydro-5,8-methano-2,3-naphthalenedicarboximido)ethane, polyurethane and antimony trioxide;

1,4-bis(5,6,7,8,9,9-hexachloro-1,2,3,4,4a,5,8,8a-octahydro-5,8-methano-2,3-naphthalenedicarboximido) ethane, polyphenylene oxide, and antimony trioxide;

1,4-bis(5,6,7,8,9,9-hexachloro-1,2,3,4,4a,5,8,8a-octahydro-5,8-methano-2,3-naphthalenedicarboximido) ethane, polyoxymethylene and antimony trioxide;

1,5-bis(5,6,7,8,9,9-hexachloro-1,2,3,4,4a,5,8,8a-octahydro-5,8-methano-2,3-naphthalenedicarboximido)-3-azapentane, ABS and antimony trioxide; 1,5-bis(5,6,7,8,9,9-hexachloro-1,2,3,4,4a,5,8,8a-octahydro-5,8-methano-2,3-naphthalenedicarboximido)-3-azapentane, polyethylene and antimony trioxide;

1,5-bis(5,6,7,8,9,9-hexachloro-1,2,3,4,4a,5,8,8a-octahydro-5,8-methano-2,3-naphthalenedicarboximido)-3-azapentane, polypropylene and antimony trioxide;

1,5-bis(5,6,7,8,9,9-hexachloro-1,2,3,4,4a,5,8,8a-octahydro-5,8-methano-2,3-naphthalenedicarboximido)-3-azapentane, polyurethane and antimony trioxide;

1,5-bis(5,6,7,8,9,9-hexachloro-1,2,3,4,4a,5,8,8a-octahydro-5,8-methano-2,3-naphthalenedicarboximido)-3-azapentane, polyphenylene oxide and antimony trioxide;

1,5-bis(5,6,7,8,9,9-hexachloro-1,2,3,4,4a,5,8,8a-octahydro-5,8-methano-2,3-naphthalenedicarboximido)-3-azapentane, polyoxymethylene and antimony trioxide, etc., as well as other ternary composition of matter containing similar antimony-containing compounds such as triethyl antimony, trimethoxy antimony, triethoxy antimony, trimethyl antimony trichloride, trimethyl antimony sulfide, etc. It is to be understood that these compositions of matter hereinbefore set forth are only representative of the class of compounds which comprise this invention, and therefore the present invention is not necessarily limited thereto.

As hereinbefore set forth the novel compositions of matter of the present invention will possess the desirable physical characteristics of improved flame retardancy and fire resistance without sacrificing other properties such as elongation, tensile strength, melt index, degree of cross-linkage, impart strength, bending strength, etc., which are usually possessed by the polymeric substance. This is of extreme importance when it is desired that the polymeric substance possesses a high degree of flame retardance while maintaining the other physical characteristics of the original compound. These improved properties of flame retardancy and fire resistance as well as a retention of other original physical characteristics of the novel compositions of matter of the present invention will be illustrated in greater detail in the following specific examples.

Example I

In this example 82.5 g. of polypropylene and 17.5 g. of the N-butyl imide of 5,6,7,8,9,9-hexachloro-1,2,3,4,4a,5,8,8a-octahydro-5,8-methano-2,3-naphthalenedicarboxylic acid were admixed in a milling machine together with 0.15 g. of a commercial oxidation inhibitor, the final composition of matter containing 82.5 weight percent of polypropylene and 7.5 weight percent of the imide. In addition, a second composition of matter was also prepared by admixing 79.5 g. of polypropylene, 17.5 g. of the N-butyl imide of 5,6,7,8,9,9-hexachloro-1,2,3,4,4a,5,8,8a-octahydro-5,8-methano-2,3-naphthalenedicarboxylic acid and 3.0 g. of antimony trioxide together with 0.15 g. of a commercial oxidation inhibitor, the final composition of matter containing 79.5 weight percent of polypropylene, 17.5 weight percent of the imide and 3.0 weight percent of antimony trioxide, said admixture being done in a milling machine similar to that used in preparing the first composition of matter.

To illustrate the improved flame retardancy of the novel compositions of matter, a series of experiments were performed. A high molecular weight commercial polypropylene which did not contain any additive but the commercial oxidation inhibitor was cut into strips, said strips containing a glass cloth in the center of the strip to prevent dripping during the combustion test. In addition, the novel compositions of matter prepared according to the above two paragraphs, that is, the one composition comprising a mixture of polypropylene and the N-butyl imide of 5,6,7,8,9,9-hexachloro-1,2,3,4,4a,5,8,8a-octahydro-5,8-methano-2,3-naphthalenedicarboxylic acid and the polypropylene, N-butyl imide of 5,6,7,8,9,9-hexachloro-1,2,3,4,4a,5,8,8a-octahydro-5,8-methano-2,3-naphthalenedicarboxylic acid and the antimony trioxide were also cut into strips. The strips were then labeled A, B, and C respectively, strip A being polypropylene alone; strip B being the binary composition of matter; and strip C being the ternary composition of matter. These strips were burned in an apparatus similar to one which was described by C. P. Fenimore and J. F. Martin in the November 1966, issue of Modern Plastics. The results of these tests are set forth in Table I below:

TABLE I

| | Oxygen index | Rate of burning in air, sec./inch |
|---|---|---|
| A | 0.180 | 55 |
| B | 0.186 | 133 |
| C | 0.196 | 209 |

It is therefore readily apparent that the strip of polypropylene which did not contain any additives had a relatively low oxygen index and a rapid rate of burning. However, the strip which comprised the novel composition of matter of the present invention, namely, the mixture of polypropylene and the N-butyl imide of 5,6,7,8,9,9-hexachloro-1,2,3,4,4a,5,8,8a-octahydro-5,8-methano-2,3-naphthalenedicarboxylic acid as well as the other novel composition of matter, namely, the mixture of polypropylene, the N-butyl imide of 5,6,7,8,9,9-hexachloro-1,2,3,4,4a,5,8,8a - octahydro - 5,8 - methano-2,3-naphthalenedicarboxylic acid and antimony trioxide both possessed higher oxygen indices and a much slower rate of burning.

Example II

In this example a high molecular weight commercial polypropylene was admixed with the N-methyl imide of 5,6,7,8,9,9 - hexachloro - 1,2,3,4,4a,5,8,8a-octahydro-5,8-methano-2,3-naphthalenedicarboxylic acid in amounts so that the finished product contained 84.6% by weight of the polypropylene and 15.4 weight percent of the N-methyl imide together with 0.15% of a commercial oxidation inhibitor. The resulting composition of matter was cut into strips similar to those described in Example I above. In addition, polypropylene per se was also cut into strips. The strip of polypropylene alone was designated as A and the strip of polypropylene and the N-methyl imide of 5,6,7,8,9,9-hexachloro-1,2,3,4,4a,5,8,8a-octahydro-5,8-methano-2,3-naphthalenedicarboxylic acid was designated as B. These strips were treated in a manner similar to that set forth in Example I above. The results of these tests are set forth in Table II below:

TABLE II

| | Oxygen index | Rate of burning in air, sec./inch |
|---|---|---|
| A | 0.180 | 55 |
| B | 0.188 | 166 |

In addition, the composition of matter comprising polypropylene and the N-methyl imide of 5,6,7,8,9,9-hexachloro - 1,2,3,4,4a,5,8,8a - octahydro - 5,8 - methano - 2,3-naphthalenedicarboxylic acid had an elongation of 464% and a yield value (p.s.i.) of 3646.

Example III

A novel composition of matter of the present invention was prepared by admixing a high molecular weight commercial polypropylene with the N-octyl imide of 5,6,7,8,9,9-hexachloro - 1,2,3,4,4a,5,8,8a-octahydro-5,8-methano-2,3-naphthalenedicarboxylic acid in sufficient amount so that the finished product contained 81.2% of polypropylene and 18.8% by weight of the octyl imide and 0.15% by weight of a commercial oxidation inhibitor. Test strips of polypropylene per se and the mixture of polypropylene and the N-octyl imide of 5,6,7,8,9,9-hexachloro-1,2,3,4,4a,5,8,8a-octahydro-5,8-methano - 2,3 - naphthalenedicarboxylic acid were prepared and subjected to treatment in a manner similar to that set forth in the above examples. The results of these burning tests are set forth in Table III below. The strip of polypropylene per se was designated as A; the other strip was designated as B.

TABLE III

| | Oxygen index | Rate of burning in air, sec./inch |
|---|---|---|
| A | 0.180 | 55 |
| B | 0.186 | 130 |

In addition, the strip comprising the mixture of polypropylene and the N-octyl imide of 5,6,7,8,9,9-hexachloro-1,2,3,4,4a,5,8,8a-octahydro-5,8 - methano - 2,3 - naphthalenedicarboxylic acid had an elongation of 638% and a yield value (p.s.i.) of 3116.

Example IV

In this example a composition of matter is prepared by admixing the N-methyl imide of 5,6,7,8,9,9-hexachloro-1,2,3,4,4a,5,8,8a-octahydro-5,8 - methano-2,3-naphthalenedicarboxylic acid and polyethylene in an amount so that the finished product will contain 85% of polyethylene and 15% of the methyl imide of 5,6,7,8,9,9-hexachloro - 1,2,3,4,4a,5,8,8a - octahydro - 5,8 - methano-2,3-naphthalenedicarboxylic acid. Another composition of matter is also prepared by admixing polypropylene, the N-methyl imide of 5,6,7,8,9,9-hexachloro-1,2,3,4,4a,5,8,-8a-octahydro - 5,8 - methano-2,3-naphthalenedicarboxylic acid and antimony trioxide in amounts so that the finished composition of matter contains 82% by weight of polypropylene, 15% by weight of the N-methyl imide of 5,6,-7,8,9,9 - hexachloro - 1,2,3,4,4a,5,8,8a - octahydro - 5,8-methano-2,3-naphthalenedicarboxylic acid and 3% by weight of antimony trioxide. The two compositions of matter are then cut into strips as is polypropylene which does not contain any other component. The three strips are then subjected to a burning test similar to that previously described in the above examples. It will be found that the oxygen index of the binary and ternary compositions of matter will be greater than that of the polypropylene per se and in addition, the rate of burning of the binary and ternary compositions of matter will be much slower than that of the polypropylene alone.

Example V

A novel composition of matter is prepared by admixing the N-methyl imide of 5,6,7,8,9,9-hexachloro-1,2,3,4,4a,5,8,8a-octahydro-5,8-methano - 2,3 - naphthalenedicarboxylic acid and a co-polymer of acrylonitrile, butadiene and styrene, the finished composition of matter containing about 82.2% by weight of ABS and 17.8% by weight of the methyl imide. Flame retardant tests comparing ABS alone and the binary composition of matter will disclose the fact that the latter compound has a much slower rate of burning than does the ABS alone.

Example VI

A binary composition of matter was prepared by admixing a co-polymer of acrylonitrile-butadiene-styrene (ABS) and the N-butyl imide of 5,6,7,8,9,9-hexachloro-1,2,3,4,4a,5,8,8a-octahydro -5,8 - methano-2,3-naphthalenedicarboxylic acid in amounts sufficient so that the finished product contained 82.5% by weight of ABS and 17.5% by weight of the N-butyl imide of 5,6,7,8,9,9-hexachloro-1,2,3,4,4a,5,8,8a-octahydro - 5,8 - methano-2,3-naphthalenedicarboxylic acid. This composition of matter was designated as B. In addition, a ternary novel composition of matter was prepared by admixing 79.5% by weight of ABS, 17.5% by weight of the N-butyl imide of 5,6,7,8,9,9-hexachloro-1,2,3,4,4a,5,8,8a-octahydro-5,8-methano-2,3-naphthalenedicarboxylic acid, and 3.0% by weight of antimony trioxide, said composition of matter being designated as C. In another attempt to show the beneficial effects of the ternary composition of matter, a third strip was prepared by milling 75.5% by weight of ABS with 17.5% by weight of the N-butyl imide of 5,6,7,8,9,9 - hexachloro - 1,2,3,4,4a,5,8,8a - octahydro - 5,8-methano-2,3-naphthalenedicarboxylic acid and 7.0% by weight of antimony trioxide. This milled strip was designated as D. To illustrate the flame-retardant property of the imide and the antimony trioxide, a strip of ABS per se was also subjected to flame-retardant tests, said strip being designated as A. The results of this test are shown in Table IV below:

TABLE IV

| | Oxygen index | Rate of burning in air, sec./inch | Rate of burning at the oxygen index of 0.25 | Yield value (p.s.i.) |
|---|---|---|---|---|
| A [1] | 0.183 | 104 | | 4,654 |
| B [1] | 0.190 | 121 | 49 | 4,366 |
| C [1] | 0.21 | | 60 | 4,488 |
| D [1] | 0.233 | | 73 | 4,606 |

[1] All contain 0.15% of a commercial oxidation inhibitor.

It is therefore noted that the strips which contained the imide had a higher oxygen index and a slower rate of burning than did the strip of ABS which did not contain any additive. In addition, the strips that contained the antimony trioxide and the imide had an oxygen index as great as or greater than the oxygen index of air and therefore did not support combustion. In addition, the yield value (p.s.i.) of the strips containing the additive were similar in nature to that of the strip which did not contain any additive.

Example VII

In this example the N-butyl imide of 5,6,7,8,9,9-hexachloro-1,2,3,4,4a,5,8,8a-octahydro - 5,8 - methano-2,3-naphthalenedicarboxylic acid is admixed with a high molecular weight polyethylene. This composition of matter is then cut into strips and subjected to a flame retardant test similar to that set forth in Example I above. The results of this test as to oxygen index and rate of burning when compared to a similar test performed on polyethylene alone will show that the binary composition of matter possesses a higher oxygen index and a slower rate of burning than does the polypropylene. In addition, yield values and elongation values of the binary composition of matter will compare favorably to the polypropylene alone.

Example VIII

In this example 14.9% by weight of the imide of 5,6,7,8,9,9 - hexachloro - 1,2,3,4,4a,5,8,8a - octahydro - 5,8-methano-2,3-naphthalenedicarboxylic acid was milled with 85.1% of polypropylene and 0.15% of a commercial oxidation inhibitor. The resulting compound was cut into strips and designated as B. Another composition of matter was prepared by milling 15% by weight of the imide of 5,6,7,8,9,9 - hexachloro - 1,2,3,4,4a,5,8,8a-octahydro-5,8-methano-2,3-naphthalenedicarboxylic acid, 82% by weight of a commercial high molecular weight polypropylene and 3% by weight of antimony trioxide. The resulting composition was cut into strips and designated as C. Still another composition of matter was prepared by milling 30% by weight of the imide of 5,6,7,8,9,9-hexachloro- 1,2,3,4,4a,5,8,8a-octahydro - 5,8 - methano-2,3-naphthalenedicarboxylic acid, 70% by weight of polypropylene and 0.15% of the oxidation inhibitor, said sample being designated as D. In addition, a commercial high molecular weight polypropylene containing 0.15% of the oxidation inhibitor was also cut into strips and designated as A. The four different samples were treated in a manner similar to that set forth in Example I above, the results of said tests being set forth in Table V below:

TABLE V

| | Oxygen index | Rate of burning in air, sec./inch |
|---|---|---|
| A | 0.180 | 55 |
| B | 0.189 | 173 |
| C | 0.194 | 239 |
| D | 0.199 | 242 |

It is therefore noted that the compositions of matter of the present invention disclose a superior flame-retardant property as illustrated by the higher oxygen index and the slower rate of burning in air as compared to the sample which did not contain any of the additives.

Example I

In this example a polyurethane foam was prepared. The form was divided into two parts designated A and B. Part B had the imide of 5,6,7,8,9,9-hexachloro-1,2,3,4,4a 5,8,8a-octahydro - 5,8 - methano-2,3-naphthalenedicarboxylic acid and antimony trioxide added thereto in sufficient amounts so that the foam contained 3.4% chlorine and 2.0% antimony trioxide, all percents being by weight of the finished product. The foams were then subjected to a burning test utilizing the process set forth in ASTM 1692–59T method of determining flammability data. The foam which did not contain the additives, foam A, had a flammability rate of 35 seconds to burn 4 inches. This is in contrast to the flammability of foam B which took 70 seconds to burn 4 inches or double the time.

Example X

In this example a compound containing a reactive substituent, namely, polymethyl methacrylate is molded with 17.5 weight percent of the N-butyl imide of 5,6,7,8,9,9-hexachloro - 1,2,3,4,4a,5,8,8a - octahydro - 5,8 - methano-2,3-naphthalenedicarboxylic acid and 6% by weight of antimony trioxide. The oxygen index of a strip of this material which is obtained by treating said material according to the method set forth in Example I above will be found to be much in excess of the oxygen index of 0.173 which is obtained when polymethyl methacrylate per se is subjected to a similar test.

Example XI

A mixture of 80 g. of styrenated poly-2,6-dimethylphenylene oxide and 20 g. of the imide of 5,6,7,8,9,9-hexachloro - 1,2,3,4,4a,5,8,8a - octahydro - 5,8 - methano-2,3-naphthalenedicarboxylic acid are extruded and resulting extrudate is cut into strips. In addition, another composition of matter is prepared by extruding 77 g. of styrenated poly-2,6-dimethylphenylene oxide, 20 g. of the imide of 5,6,7,8,9,9 - hexachloro - 1,2,3,4,4a,5,8,8a - octahydro - 5,8 - methano - 2,3 - naphthalenedicarboxylic acid and 3.0 g. of antimony trioxide. This extrudate is also cut into strips. The two strips were then subjected to a burning test and compared with a strip of styrenated poly-2,6-dimethylphenylene oxide which did not have anything added thereto. The binary and ternary compositions of matter will be found to have a higher oxygen index and a slower burning rate than will the strip of styrenated poly-2,6-dimethylphenylene oxide which does not contain any other component.

Example XII

To further illustrate the unexpected synergistic flame retardant property which is obtained when admixing a polymeric substance, an imide and antimony trioxide to form the novel compositions of matter of the present invention, another experiment was performed in which a high molecular weight commercial polypropylene was admixed with various amounts of antimony trioxide. For example, polypropylene was admixed with antimony trioxide in proportions so that the finished polypropylene strips contained 1.96, 3.84, 5.65, and 8.25 wt. percent of antimony trioxide respectively, the aforementioned strips containing the aforesaid weight percents of antimony trioxide being labeled B, C, D, and E. In addition a test strip of untreated polypropylene was milled and labeled A. A combustion test similar to that hereinbefore set forth was performed, the results being set forth in Table VI below:

TABLE VI

| | Wt. percent antimony trioxide | Wt. percent polypropylene | Oxygen index |
|---|---|---|---|
| A | 0 | 100 | 0.180 |
| B | 1.96 | 98.04 | 0.185 |
| C | 3.84 | 96.16 | 0.186 |
| D | 5.65 | 94.35 | 0.185 |
| E | 8.25 | 91.75 | 0.186 |

It is obvious from the above data that the antimony trioxide is ineffected per se as a flame retardant.

Example XIII

To illustrate the unexpectedly larger flame retardant synergism which is obtained when combining a metal compound such as antimony trioxide with an imide of a polyhalo-substituted polyhydrocyclicdicarboxylic acid, a series of combustion tests to obtain the oxygen index of the various compositions of matter were effected. The combustion test which was utilized was similar to the method described in the November 1966 issue of Modern Plastics by C. P. Fenimore and J. F. Martin. In this test a commercial high molecular weight polypropylene was utilized as the substrate. Various compositions of matter were prepared by milling this high molecular weight polypropylene with 5,6,7,8,9,9 - hexachloro - 1,2,3,4,4a, 5,8,8a - octahydro - 5,8 - methano - 2,3 - naphthalenedicarboxylic anhydride and with a combination of 5,6,7, 8,9,9 - hexachloro - 1,2,3,4,4a,5,8,8a - octahydro - 5,8-methano - 2,3 - naphthalenedicarboxylic anhydride and antimony trioxide. After milling the compounds, the resulting compositions of matter were then formed into test strips. The strip labeled A contained only the high molecular weight polypropylene; strip B contained 15% by weight of the polypropylene of 5,6,7,8,9,9 - hexachloro - 1,2,3,4,4a,5,8,8a - octahydro - 5,8 - methano-2,3-naphthalenedicarboxylic anhydride and strip C contained polypropylene plus 15 weight percent of 5,6,7,8, 9,9-hexachloro - 1,2,3,4,4a,5,8,8a - octahydro-5,8-methano-2,3 - naphthalenedicarboxylic anhydride and 6.0 weight percent of antimony trioxide. The chlorine content of strips B and C was 7.5% in the polypropylene. The results of these combustion tests are set forth in Table VII below:

TABLE VII

| | Flame retardant | Wt. percent | Antimony trioxide, wt. percent | Oxygen index |
|---|---|---|---|---|
| A | None | None | None | 0.180 |
| B | 5,6,7,8,9,9-hexachloro-1,2,3,4, 4a,5,8,8a-octahydro-5,8-methano-2,3-naphthalenedicarboxylic anhydride. | 15.0 | None | 0.186 |
| C | 5,6,7,8,9,9-hexachloro-1,2,3,4, 4a,5,8,8a-octahydro-5,8-methano-2,3-naphthalenedicarboxylic anhydride. | 15.0 | 6.0 | 0.195 |

As is noted from the above table, the oxygen index (the lowest mol fraction of oxygen sufficient to maintain combustion) of the commercial propylene was 0.180. Strip B which contained only the 5,6,7,8,9,9 - hexachloro-1,2,3,4,4a,5,8,8a - octahydro - 5,8 - methano - 2,3 - naphthalenedicarboxylic anhydride had an oxygen index of 0.186, while strip C which contained a combination of 5,6,7,8,9,9 - hexachloro - 1,2,3,4,4a,5,8,8a - octahydro-5,8 - methano - 2,3 - naphthalenedicarboxylic anhydride and antimony trioxide possessed an oxygen index of 0.195. Therefore, the difference (or Δ O. I.) in the oxygen indices of the various strips of treated polypropylene which was due to the addition of the antimony trioxide to the 5,6,7,8,9,9 - hexachloro - 1,2,3,4,4a,5,8,8a - octahydro - 5,8 - methano - 2,3 - naphthalenedicarboxylic anhydride was only 0.009.

Another series of combustion tests were performed which were similar to that described in the above paragraph. In this test, a series of strips were prepared by milling a commercial high molecular polypropylene with the 1,5 - bis(5,6,7,8,9,9-hexachloro-1,2,3,4,4a,5,8,8a-octahydro-5,8-methano - 2,3 - naphthalenedicarboximido)-3-azapentane and with the bisimide of antimony trioxide. After milling the above compounds, test strips were prepared which were similar to those used in the above paragraph. Strip D consisted only of the high molecular weight propylene. Strip E contained polypropylene along with 17.2 wt. percent of 1,5-bis(5,6,7,8,9,9-hexachloro-1,2,3,4,4a,5,8,8a-octahydro - 5,8 - methano-2,3-naphthalenedicarboximido)-3-azapentane; while strip F contained polypropylene, 17.2 weight percent of the 1,5-bis(5,6,7,8,9,9-hexachloro-1,2,3,4,4a,5,8,8a - octahydro-5,8-methano-2,3-naphthalenedicarboximido)-3-azapentane and 6.0 wt. percent of antimony trioxide.

As in the previous series of tests the chlorine content in the polypropylene in strips E and F was 7.5%. The three strips were again subjected to the combustion test described in the November 1966 issue of Modern Plastics, the results of which are set forth in Table VIII below:

TABLE VIII

| Flame retardant | Wt. percent | Antimony trioxide, wt. percent | Oxygen index |
|---|---|---|---|
| D -- None | None | None | 0.180 |
| E -- 1,5-bis(5,6,7,8,9,9-hexachloro-1,2,3,4,4a,5,8,8a-octahydro-5,8-methano-2,3-naphthalenedicarboximido)-3-azapentane. | 17.2 | None | 0.193 |
| F -- 1,5-bis(5,6,7,8,9,9-hexachloro-1,2,3,4,4a,5,8,8a-octahydro-5,8-methano-2,3-naphthalenedicarboximido)-3-azapentane. | 17.2 | 6.0 | 0.220 |

As is noted from the above table, the oxygen index of the untreated polypropylene was 0.180; the oxygen index of the strip which contained the bisimide was 0.193 while the oxygen index of the strip of polypropylene which contained a combination of the bisimide and the antimony trioxide was 0.220. This clearly indicates that the addition of the antimony trioxide to the bisimide resulted in an oxygen index differential of 0.027. A comparison of this oxygen index differential indicates that the addition of the antimony trioxide to the bisimide of a polyhalo-substituted polyhydrocyclicdicarboxylic acid was three times as great as when antimony trioxide was added to the polyhalo-substituted polyhydropolycyclicdicarboxylic anhydride (a Δ O. I. of 0.027 as compared to a Δ O. I. of 0.009).

Example XIV

To further illustrate the superiority of the novel compositions of matter of the present invention as compared to other polymeric substrates containing polyhalo-substituted polyhydrocyclicdicarboxylic acids or anhydrides thereof as flame retardants and antimony trioxide as a compound to promote synergism, a series of tests were run utilizing ABS as the polymeric substrate. In these examples ABS was compounded with 15 wt. percent of 5,6,7,8,9,9-hexachloro - 1,2,3,4,4a,5,8,8a - octahydro-5,8-methano-2,3-naphthalenedicarboxylic anhydride in one sample and a second sample was compounded utilizing 7 wt. percent of antimony trioxide and 15 wt. percent of 5,6,7,8,9,9-hexachloro - 1,2,3,4,4a,5,8,8a - octahydro-5,8-methano-2,3-naphthalenedicarboxylic acid. A third sample was prepared by admixing ABS with 17.5 wt. percent of the N-butyl imide of 5,6,7,8,9,9-hexachloro-1,2,3,4,4a,5,8,8a-octahydro-5,8-methano - 2,3 - naphthalenedicarboxylic acid. A fourth sample was prepared by admixing ABS with 7.0 wt. percent of antimony trioxide and 17.5 wt. percent of the N-butyl imide of 5,6,7,8,9,9-hexachloro-1,2,3,4,4a,5,8,8a - octahydro - 5,8 - methano-2,3-naphthalenedicarboxylic acid. In addition two other samples were prepared which contained 15.4 wt. percent of the N-methyl imide of 5,6,7,8,9,9-hexachloro-1,2,3,4,4a,5,8,8a-octahydro-5,8-methano-2,3 - naphthalenedicarboxylic acid with ABS and the last one consisted of a mixture of ABS containing 7.0 wt. percent of antimony trioxide and 15.4 wt. percent of the N-butyl imide of 5,6,7,8,9,9-hexachloro-1,2,3,4,4a,5,8,8a-octahydro-5,8-methano - 2,3 - naphthalenedicarboxylic acid. The results of these tests are shown in Table IX below:

TABLE IX

| Sample | Flame retardant, wt. percent | Antimony trioxide, wt. percent | Yield value, p.s.i. |
|---|---|---|---|
| A | None | None | 4,654 |
| B | 15.0 | None | 4,138 |
| C | 15.0 | 7.0 | 2,178 |
| D | 17.5 | None | 4,366 |
| E | 17.5 | 7.0 | 4,606 |
| F | 15.4 | None | 4,288 |
| G | 15.4 | 7.0 | 4,354 |

From the above table it is noted that the novel composition of matter of the present invention which comprises ABS, an imide of a polyhalo-substituted polyhydrocyclicdicarboxylic acid and an antimony trioxide possesses superior physical characteristics as compared to a composition of matter which comprises ABS, a polyhalo-substituted polyhydrocyclicdicarboxylic anhydride and antimony trioxide, the latter compound showing a yield value which has been lowered by about 50% while no such reduction in the yield value is observed with the composition of matter of the present invention, thus indicating that the combination of antimony trioxide with an imide of a type set forth in the present application does not show the deleterious effect shown by the anhydride when compounded with antimony trioxide.

We claim as our invention:

1. A flame retardant composition of matter selected from the group consisting of polyolefins and ABS containing from about 0.5 to about 10 wt. percent of an antimony-containing compound and from about 5 to about 50 wt. percent of an imide of a halogen substituted polyhydrocyclicdicarboxylic acid having the formula:

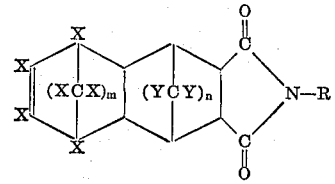

or

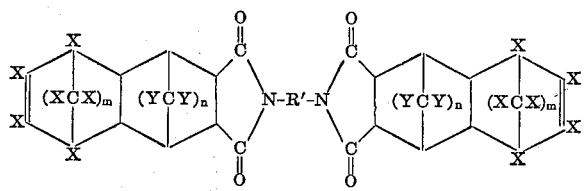

in which X is halogen or hydrogen, at least two X's being halogen; Y is halogen or hydrogen; $m$ is 1 to 2; $n$ ranges from 0 to 2; R is selected from the group consisting of hydrogen and monovalent R'; and R' is selected from the group consisting of alkyl and aminoalkyl of from 1 to 20 carbon atoms, polyalkenepolyamino, aryl, haloaryl, alkoxyaryl; polyarylenepolyamino of from 1 to 3 carbocyclic rings and aminocyclopolyalkyl and polyalkenepolyamino having from 4 to 8 carbon atoms on the ring.

2. The flame retardant composition of claim 1 in which said halogen is chlorine.

3. The flame retardant composition of claim 1 in which said halogen is bromine.

4. The flame retardant composition of claim 1 in which said antimony-containing compound is antimony trioxide.

5. The flame retardant composition of claim 1 in which said antimony-containing compound is an antimony oxyalkyl derivative.

6. The flame retardant composition of claim 1 being polypropylene, from about 0.2 to about 10 wt. percent of antimony trioxide and from about 5 to about 50 wt. percent of N-methylimide of 5,6,7,8,9,9-hexachloro-1,2,3,4,4a,5,8,8a-octahydro-5,8-methano-2,3-naphthalenedicarboxylic acid.

7. The flame retardant composition of claim 1 being polypropylene, from about 0.2 to about 10 wt. percent of antimony trioxide and from about 5 to about 50 wt. percent of 1,5-bis(5,6,7,8,9,9-hexachloro-1,2,3,4,4a,5,8,8a-octahydro-5,8-methano-2,3-naphthalenedicarboximido)-3-azapentane.

8. The flame retardant composition of claim 1 being ABS, from about 0.2 to about 10 wt. percent of antimony trioxide and from about 5 to about 50 wt. percent of N-methyl imide of 5,6,7,8,9,9-hexachloro-1,2,3,4,4a,5,8,8a-octahydro-5,8-methano-2,3-naphthalenedicarboxylic acid.

9. The flame retardant composition of claim 1 being ABS, from about 0.2 to about 10 wt. percent of antimony trioxide and from about 5 to about 50 wt. percent of N-butyl imide of 5,6,7,8,9,9 - hexachloro - 1,2,3,4,4a,5,8,8a-octahydro-5,8-methano-2,3-naphthalenedicarboxylic acid.

10. The flame retardant composition of claim 1 being polypropylene, from about 0.2 to about 10 wt. percent of antimony trioxide and from about 5 to about 50 wt. percent of N-butyl imide of 5,6,7,8,9,9-hexachloro-1,2,3,4,4a, 5,8,8a-octahydro - 5,8 - methano - 2,3 - naphthalenedicarboxylic acid.

References Cited

UNITED STATES PATENTS

| | | | |
|---|---|---|---|
| 3,465,006 | 9/1969 | Schmerling | 260—2 R |
| 3,442,977 | 5/1969 | Grabowski | 260—876 |
| 3,208,939 | 9/1965 | Latos | 260—326 C |
| 3,280,143 | 10/1966 | Hayes | 106—15 FP |
| 3,455,950 | 7/1969 | Cyba et al. | 260—326 C |

THEODORE MORRIS, Primary Examiner

U.S. Cl. X.R.

106—15 FP; 260—41 B, 45.8 N

Notice of Adverse Decision in Interference

In Interference No. 100,053, involving Patent No. 3,734,758, H. A. Cyba and A. K. Sparks, NOVEL FLAME RETARDANT COMPOSITIONS OF MATTER, final judgment adverse to the patentees was rendered Feb. 23, 1983, as to claim 1.

[*Official Gazette July 12, 1983.*]